UNITED STATES PATENT OFFICE.

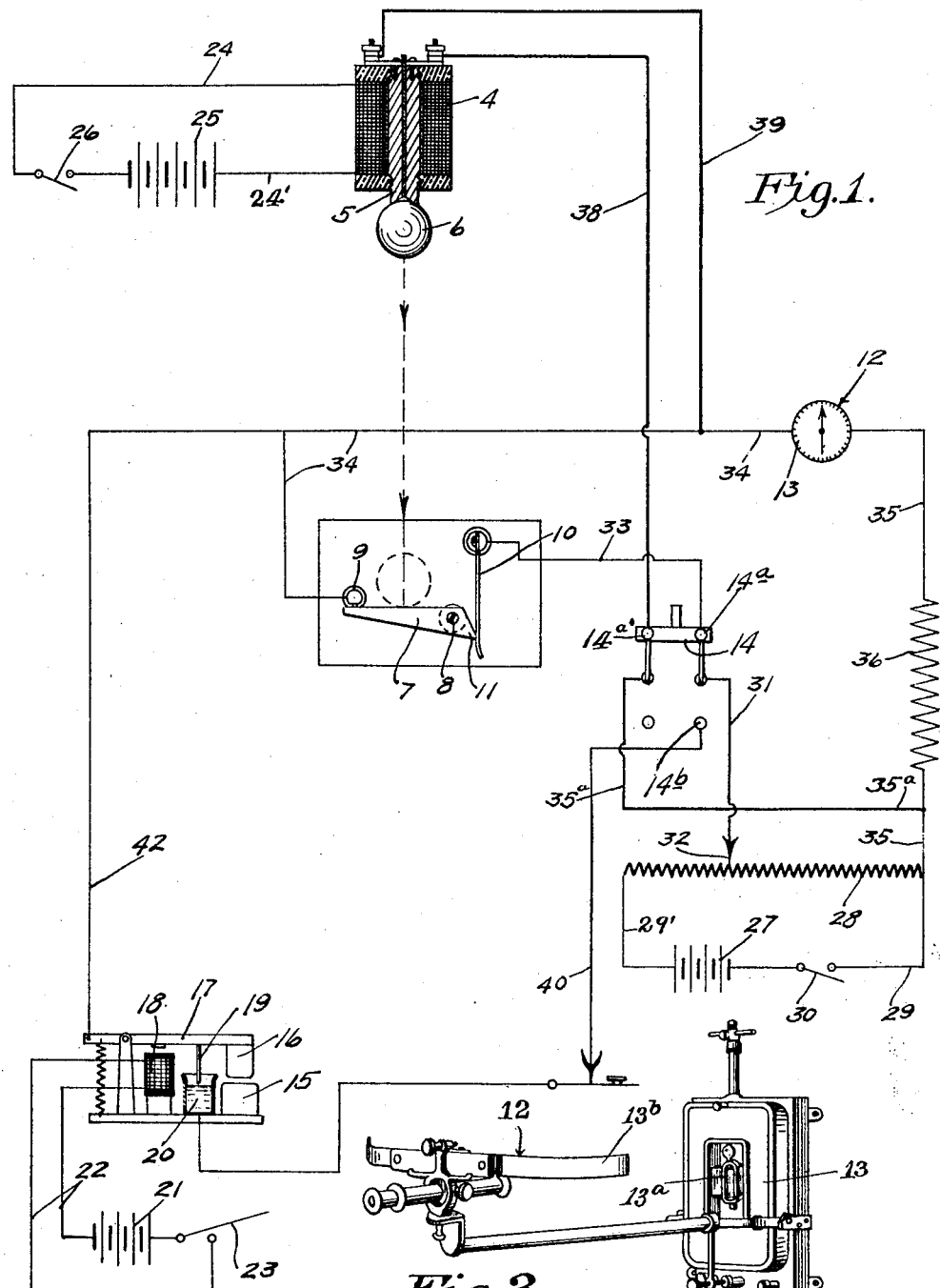

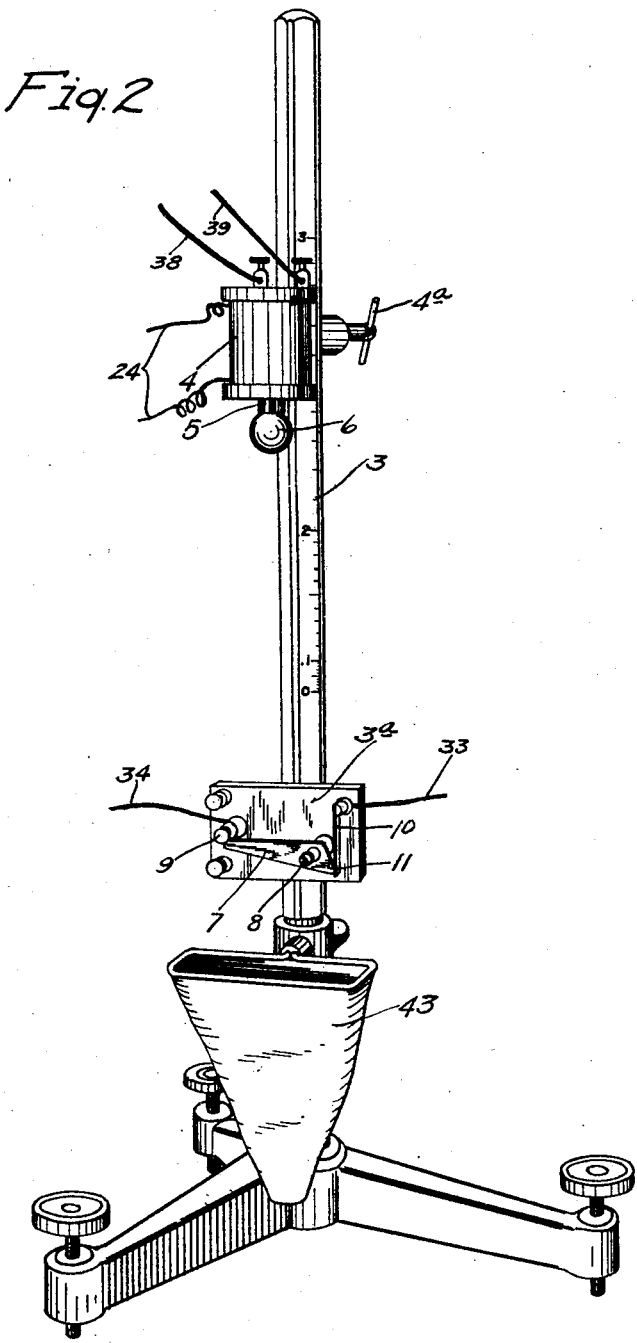

PAUL E. KLOPSTEG, OF MINNEAPOLIS, MINNESOTA.

GALVANOMETER-CHRONOSCOPE.

1,323,477.

Specification of Letters Patent.

Patented Dec. 2, 1919.

Application filed October 4, 1917. Serial No. 194,781.

*To all whom it may concern:*

Be it known that I, PAUL E. KLOPSTEG, a citizen of the United States, residing at Minneapolis, in the county of Hennepin and State of Minnesota, have invented certain new and useful Improvements in Galvanometer-Chronoscopes; and I do hereby declare the following to be a fully clear, and exact description of the invention, such as will enable others skilled in the art to which it appertains to make and use the same.

The invention relates to apparatus for measuring short time intervals, particularly in connection with psychological, physiological and physical tests or demonstrations; and has for its object to provide a relatively simple, highly efficient and inexpensive apparatus capable of measuring very small time intervals with exceeding accuracy. To this end the invention comprises an electrical system, which involves a d'Arsonval galvanometer, on the scale of which the time intervals being measured are directly indicated, which electrical system is arranged with means for controlling and adjusting the operative current in the galvanometer, and for calibrating and correcting the galvanometer indications so that the latter will correctly represent time elements. The calibrating means include a "fall apparatus," adapted to be interpolated in the galvanometer circuit, so that the falling element first breaks a shunt circuit to the galvanometer, which causes the latter to begin its operative movement, and subsequently breaks the main circuit, thereby limiting the operative movement of the galvanometer, so that the extent of such galvanometer movement will correspond to the time interval between the successive breaking of the two circuits by the fall device. The said fall apparatus is adjustable to vary the distance through which the falling element thereof moves, so that the exact time which elapses between the breaking of the first and second circuits by the fall element can be determined directly from an appropriate scale associated with the fall apparatus, and the galvanometer scale may be graduated and calibrated for direct indications of time intervals.

In the accompanying drawings, a simple form of the invention is illustrated:

Figure 1 is a diagrammatic view of the apparatus as applied to the taking of reaction time measurements as in psychological tests.

Fig. 2 is a perspective view of the fall apparatus.

Fig. 3 is a perspective view of a suitable galvanometer employed in connection with the apparatus.

Referring to Fig. 1 of the drawings, the numeral 27 indicates a source of current, preferably an electrical battery, the terminals of which are connected by means of leads 29 and 29' to the respective ends of an adjustable resistance 28, with which coöperates a movable contact 32, which in turn is connected with a lead 31 constituting one of the conductor elements of a composite electric circuit. A suitable circuit closer 30 is interpolated in the lead 29 from battery 27. The lead 31 is connected to one terminal of a double throw double pole switch 14, which coöperates with two active contacts $14^a$ and $14^{a'}$ on one side and a single active contact $14^b$ on the opposite side. From contact $14^a$, a wire 33 extends to a spring contact 10, which is mounted upon a suitable baseboard and constitutes one of the elements of a circuit closer or switch, associated with the fall apparatus. Pivotally mounted on the stud 8 is a switch lever 7 having its shorter end provided with a nose-like projection 11, in contact with the spring 10, and having its longer arm extended to engage a fixed contact 9, which in turn is connected by lead 34 with one terminal of a galvanometer 12, which latter is connected by means of a lead 35 with one end of the resistance element 28, said lead 35 including a high resistance coil 36.

As indicated, the galvanometer employed is preferably of the d'Arsonval type, which is provided with a movable coil $13^a$ carrying a mirror which reflects a beam of light onto a suitable scale $13^b$. For example, the galvanometer which is particularly well adapted for the apparatus is an instrument made by Leeds & Northrup Company, of Philadelphia, Pa., and identified as No. 2230 d'Arsonval type galvanometer.

To the other arm of the double throw switch 14 there is connected a lead $35^a$ which joins lead 35 between the resistances 28 and 36 respectively. The coöperating upper terminal $14^{a'}$ of said switch 14 is connected by lead 38 to one side of the divided core of the magnet of the fall apparatus, the other side of said divided core being connected by a lead 39 to lead 34, so that the leads $35^a$, 38 and 39 with the interpolated magnet core sections and the armature member, which constitutes the fall element of the fall apparatus, form a shunt about the galvanometer 12.

The fall apparatus, as shown, comprises a suitable standard 3 of square cross section on which is adjustably supported, by means of a set screw 4ª, an electromagnet 4 provided with a divided core 5, separated by an insulating strip passing longitudinally through the same, the lower end of which core projects beyond the face of the magnet and constitutes a pole piece to support and hold a ball 6 of iron or other suitable magnetic material when the magnet is energized, said ball 6 also constituting a bridge piece or circuit closer between the sections of the divided core, and thereby completing the circuit between leads 38 and 39, and breaking the circuit between said leads and thereby interrupting the shunt about the galvanometer 12 when the ball 6 is released and drops away from the core 5. The magnet 4 is energized from a battery 25 which is connected to the respective terminals of the magnet by leads 24 and 24' in one of which is included a suitable switch 26.

The support for the switch arm 7, contact spring 10 and fixed contact 9, represented by a plate 3ª of insulating material, is fixed to the lower end of the standard 3 directly below the core 5 of the magnet 4 and therefore in the path of the ball 6 when the latter is released. Below the switch 7 there is mounted a suitable basket 43 adapted to catch and retain the ball 6 after the same has been released and falls from its engagement with the core of magnet 4.

In operating the system as thus described, the switch 14 is turned to close the circuits at contacts 14ª and 14ª′ and switch 7 of the fall device is moved into engagement with the fixed contact 9, where it is held by spring 10. The circuit through magnet 4 is closed at switch 26 and the ball 6 is applied to the end of the magnet core 5, thereby bridging the gap in circuit leads 38 and 39. The movable contact 32 is adjusted with respect to the resistance wire 28 to impose any desired potential difference, less than that of battery 27, upon the galvanometer. The switch 26 controlling the circuit which energizes the electromagnet 4 is opened, thereby deënergizing said magnet and permitting the ball 6 to fall away from the core 5, the first effect of which is to break the shunt around the galvanometer 12, formed by leads 35ª, switch contact 14ª′, lead 38, divided core 5 of the magnet 4, ball 6 which bridged said divided core, lead 39 and lead 34. The breaking of said shunt causes the whole current to pass through the galvanometer and the movable coil thereof immediately begins to swing, and, as the swinging motion is relatively slow, the extent of movement of the coil may be accurately determined on the scale 13ᵇ, by means of the telescope attached to the galvanometer, as will be understood by those familiar with instruments of this type. As the ball approaches the lower limit of its movement, it strikes lever 7 and swings the same on its pivot 8 so as to cause the end thereof to move out of contact with post 9, which breaks the main circuit, from battery 27, leads 29′ and 31, switch contact 14ª, lead 33, spring contact 10, switch arm 7, contact 9, lead 34, fixed coil of the galvanometer 12, leads 35 and 29, back to the battery 27. The breaking of the main circuit immediately stops the flow of current through the galvanometer coil and the extent of movement or throw of the galvanometer coil will correspond exactly with the quantity of electricity flowing through the galvanometer.

Any quantity of electricity of sufficient magnitude when discharged through a galvanometer of the type indicated, produces a throw or swing of a coil through a certain angle, whence the coil immediately begins its return toward its position of rest, which latter position is maintained without overthrow because of the "dead beat" character of the instrument. The throw or angle of swing is a function of the total quantity of electricity which has passed through the galvanometer. This quantity is expressed algebraically as $Q = t \times I$, in which Q is the quantity. I the current intensity or rate and $t$ the time interval. When the rate at which the quantity passes is constant, in other words, when the current is unchanging in strength during the interval in which it flows, the quantity of electricity is calculable from the observed angle of throw. This fact has been made the basis for the measurement of time intervals as long as five seconds and more, with an accuracy of a few thousandths of a second. Applying this rule to the apparatus of the present invention, it therefore follows that the throw of the galvanometer coil, indicated by the extreme limit of movement of the beam of light, will indicate the time interval of the current flow through the galvanometer, whereby by varying the time intervals by adjusting the magnet 4 on the standard 3 to regulate the distance through which the ball 6 falls before striking the switch lever 7, the current rate I being constant, the various throws or swinging movements of the galvanometer coil indicated on the scale will be commensurate with the corresponding time intervals indicated by the fall device, so that the galvanometer scale may be directly calibrated to indicate time intervals. When the time interval to be measured is short, say in the order of one-thirtieth of the time required by the coil to execute one complete vibration, the throw is, for practical purposes, directly proportional to the quantity, and therefore, with a given current strength, to the time intervals. It thus becomes possible to employ a galvanometer scale to indicate time intervals directly, with any desired range up to half the time occupied by one complete vibration of the coil. For very short intervals, corresponding to those of reaction time, for example, the galvanometer scale will be one of equal divisions.

The standard 3 is graduated by a suitable scale to represent different time intervals and therefore to accurately indicate the time required for the ball to fall from any adjusted position of the magnet 4 and break the main circuit at switch arm 7. It will be apparent, therefore, that by adjusting the magnet to various positions along the standard 3 so that the ball 6 will fall through various predetermined distances, the readings of the galvanometer 12 may be accurately calibrated and adjusted to represent time intervals corresponding exactly to the time intervals of fall of the ball aforesaid. It will also be apparent that the galvanometer may be adjusted and calibrated for time readings, so that the apparatus may be employed as a measuring device for indicating short time intervals produced by various agencies; but the fall device is nevertheless maintained in its proper relation to the other parts of the apparatus so that the galvanometer may be checked up from time to time, and any reading thereof may be verified by operating the time device and adjusting the distance through which the ball falls until the given reading of the galvanometer is reproduced, the corresponding time element indicated by the fall device then giving the correct time interval indicated by the galvanometer reading.

The apparatus as shown in Fig. 1 is particularly adapted to psychological reaction time measurements and to effect this purpose, there is connected to one side of the apparatus, a circuit including a so-called electric sound hammer, which includes an electromagnet 18 energized by a battery 21 through leads 22, including a switch 23. Coöperating with the electromagnet 18 is a pivoted armature 17 carrying a hammer 16 at its end which is adapted to engage an anvil 15 when the magnet 18 is energized. Said armature also carries a movable contact 19 adapted to dip into a mercury cup 20 when the magnet is energized. A lead 40 is connected with terminal 14ᵇ of the double throw switch 14 and in said lead is interpolated a make and break switch 41. The other end of said lead is connected to the mercury contact cup 20 and the circuit is completed by means of a lead 42 connected at one end to the conductor armature 17 and at the other end to the lead 34, which is connected to the galvanometer 12, as hereinbefore described.

In applying the apparatus as thus constituted, the switch 23 which controls electromagnet 18 is opened and the double throw switch 14 is turned to its lower position so that its right hand blade engages terminal 14ᵇ. The subject whose reaction time is to be determined holds his finger on key 41 ready to break the galvanometer circuit through lead 40 as soon as he hears the sound produced by the hammer 16. The operator in charge of the test depresses key 23, thereby energizing magnet 18 and causing the latter to attract armature 17, which brings the hammer 16 into engagement with the anvil 15 to produce a click or definite sound which indicates to the subject that he is to operate key 41. The downward movement of armature 17 closes the circuit through the galvanometer as follows:— battery 27, lead 29 left hand section of the resistance 28, movable contact 32, lead 31, right hand blade of switch 14, contact 14ᵇ, lead 40, key 41, mercury contact 20, armature contact 19, armature 17, lead 42, lead 34 through the galvanometer, thence by lead 35 through resistance 36, lead 29, back to battery 27. The closing of the galvanometer circuit causes a deflection of the indicating element of said galvanometer, and the movable coil thereof will swing through an arc which will be determined by the time that the circuit through the galvanometer is closed. This time will be determined by the reactive factor of the subject who manipulates key 41; that is to say, the indication of the galvanometer on its scale will correspond to the time element between the click produced by the engagement of the hammer 16 with the anvil 15 and the breaking of the circuit through the galvanometer by the subject who operates key 41. Inasmuch as the galvanometer has been adjusted or calibrated by means of the fall apparatus, the extent of the deflection indicated by the galvanometer can be read directly as the time interval which elapses between the closing of the galvanometer circuit at contacts 19, 20 and the breaking of the galvanometer circuit by the subject at key 41. If it is desired to check up the time interval indicated, the switch 14 is thrown to its opposite position to include the fall apparatus in the circuit of the apparatus and the said fall apparatus is so adjusted and manipulated until the ball falling through a predetermined distance and operating switch 7 will reproduce the same deflection or indication at the galvanometer, and by reading the time of fall of the ball on the standard 3 of the fall apparatus, the psychological reaction time of the subject as indicated by the galvanometer will be checked and verified.

It will be understood that the time scale of the fall apparatus is graduated to indicate time in accordance with the law of falling bodies.

From the foregoing description, it will be apparent that the flow of current through the galvanometer in each instance is determined and calculated by reference to the time required for the ball to fall from its position of rest, in engagement with the end of the core 5 of magnet 4 of the fall device, into contact with the switch arm 7 to break the main circuit of the galvanometer at contact 9, so that any time interval of relatively short duration may be measured and determined by the apparatus, directly from the scale of the galvanometer, by calibrating the latter either before or after the desired test is made by appropriately operating the fall apparatus as hereinbefore described. Bearing in mind that the initial and terminal instants of the interval to be measured are, at least in the control apparatus, to be marked by two breaks of electrical circuits, it is to be observed that the problem in the design of the apparatus is to obtain exact coincidence between each of these two instants, respectively, and the corresponding break of a circuit. A fall apparatus of the character described, employing a smooth iron or steel ball as the falling body, was chosen, for the reason that the distance of fall corresponding to certain time intervals can be accurately calculated, and that for short intervals involved in these measurements, the air resistance to such a ball introduces no appreciable error. These circumstances render the fall apparatus independent of any other control, such as a tuning fork, for example.

It will be seen, therefore, that the present invention involves a simple form of chronoscope, especially suited to the measurement of relatively small time intervals with comparatively negligible error, the particular instrument described being capable of measuring any time intervals varying from 2½ seconds to a very small fraction of a second, the apparatus including a galvanometer with a direct reading time scale, the indications of the scale corresponding to the intervals during which a steady current is permitted to flow through the instrument. The calibration of the scale depends upon the known relation between the total quantity of electricity which has passed through the galvanometer during a given time interval, and the length of this interval. As a means of adjustment and control of the scale readings, a novel form of fall apparatus is employed, which actually "measures out" to the chronoscope any time interval within the range of the latter.

What I claim is:—

1. The combination with a galvanometer having a scale, of a fall device electrically connected therewith for comparing and calibrating the scale of the galvanometer to give correct time readings.

2. The combination with a galvanometer having a main circuit including means for interrupting the latter, of a shunt to the galvanometer, and a fall device including a releasable body adapted to make and break said shunt and subsequently operate the main circuit interrupting means.

3. The combination with a galvanometer having a scale, of a fall device having a direct reading time scale, and electrical connections between the galvanometer and the fall device for operating the galvanometer; whereby the galvanometer scale may be compared with and calibrated by the fall device to give correct time readings.

4. The combination with a galvanometer having a scale, of a fall device having a direct reading time scale and electrical connections between the galvanometer and the fall device, including means for adjusting the operative current, and means for controlling the flow of the current through the galvanometer; whereby the galvanometer scale may be graduated and calibrated to give correct time readings.

5. Apparatus for measuring small time intervals comprising an electric circuit including a galvanometer having a scale and a shunt to said galvanometer, and an adjustable fall device adapted to break the shunt and main circuits to the galvanometer successively, to calibrate the galvanometer scale in terms of time intervals.

6. Apparatus for measuring small time intervals comprising an electric circuit including a galvanometer having a scale and a shunt to said galvanometer, and an adjustable fall device having a direct reading time scale and including a fall element adapted to successively break the shunt and main circuits to the galvanometer to calibrate the galvanometer scale in terms of time intervals.

7. Apparatus for measuring small time intervals comprising an electric circuit including a galvanometer having a scale and a shunt to said galvanometer, and an adjustable fall device having a direct reading time scale and including an electromagnet having a divided core constituting elements of the shunt to said galvanometer, a magnetic body adapted to be held by the core to complete said shunt, and a switch in the main circuit to said galvanometer adapted to be opened by the fall of said magnetic body, whereby the scale of the galvanometer may be calibrated in terms of time intervals corresponding to the time intervals of the magnetic body in successively breaking the shunt and main circuits.

8. A fall apparatus comprising means for simultaneously releasing a body adapted to fall freely and opening a shunt circuit, and a second means operated by the falling body for opening a main circuit at the instant the body has fallen through a predetermined time.

9. A fall apparatus comprising an electromagnet having a divided core, constituting elements of an electrical circuit, and a metal mass arranged to be magnetically held by said core and when thus held, constituting an element of the said circuit.

10. A fall apparatus comprising an electromagnet having a divided core, constituting magnetic elements of an electrical circuit, and a metal mass arranged to be magnetically held by said core and when thus held constituting an element of the said circuit, and another circuit having a switch with a part upon which said mass is arranged to fall.

11. A fall apparatus comprising an electromagnet having a divided core, constituting elements of an electrical circuit, and a metal mass arranged to be magnetically held by said core and when thus held constituting an element of said circuit, a galvanometer connected in said circuit with the sections of said core, and means to release said mass from the poles of said core.

12. A fall apparatus comprising a standard having a scale thereon, an electromagnet vertically adjustable on said standard and having a divided core constituting elements of an electrical circuit, a metal mass arranged to be magnetically held by said core and when thus held constituting an element of the said circuit, and another circuit having a switch carried by said standard and having a part upon which said mass is arranged to fall.

In testimony whereof I affix my signature in presence of two witnesses.

PAUL E. KLOPSTEG.

Witnesses:
CLARA DEMAREST,
BERNICE G. BAUMANN.